Aug. 8, 1950　　A. K. HOVEY-KING ET AL　　2,518,322
TIMBER DRAG

Filed Nov. 4, 1946　　2 Sheets-Sheet 1

Inventors
ALBERT K. HOVEY-KING
JAMES H. LOCKHART
By Bernard F. Gormley
Attorney

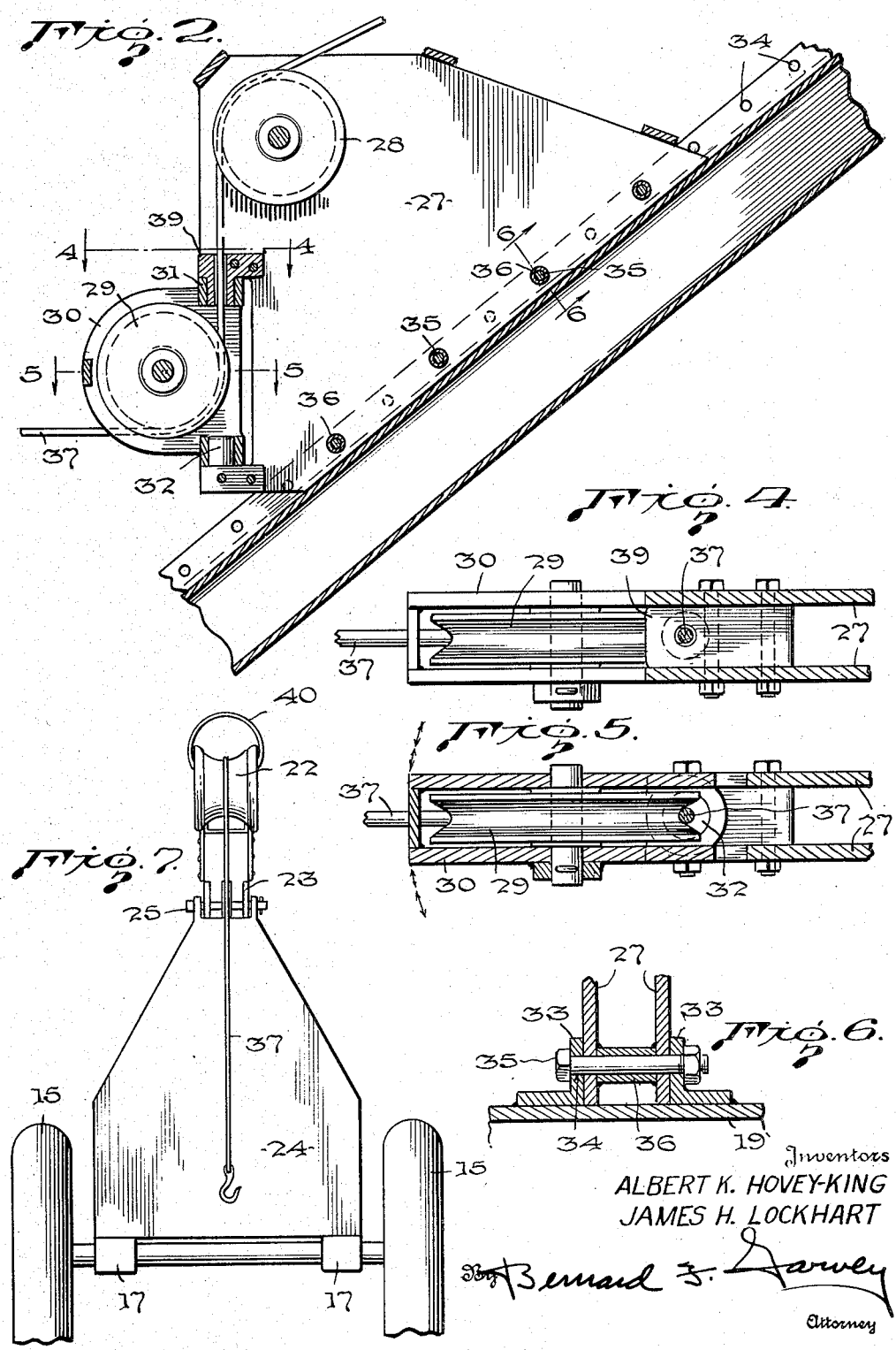

Patented Aug. 8, 1950

2,518,322

UNITED STATES PATENT OFFICE 2,518,322

TIMBER DRAG

Albert K. Hovey-King, Falls Church, Va., and James H. Lockhart, Washington, D. C., assignors to Paving Supply and Equipment Company, Washington, D. C.

Application November 4, 1946, Serial No. 707,690

6 Claims. (Cl. 212—7)

The present invention consists of a timber drag for use in holding an end of a bundle of timbers elevated from the ground while the timbers are being dragged by a power unit or traction means.

Among the objects of this invention are the provision of a combined power unit and drag, the power unit being preferably a winch equipped tractor of conventional design, the winch being powered by the tractor motor to wind the cable and correspondingly raise the end of the timber bundle embraced by a free end of the cable; to provide a drag which includes a fair lead assembly with a cable take off sheave, the assembly being adjustable to insure positioning of said sheave in the same horizontal plane with the tractor winch to insure effective cable takeup and reduce cable and drag strain to a minimum during transportation of the timber; and to provide a drag of simple yet rugged construction which may be quickly engaged with a tractor by use of a single bolt or pin, the connection embodying a universal hitch or connection affording ample flexibility between the tractor and the hitch.

It is also within the contemplation of this invention to include in the drag a bumper plate for the timber which will at all times be located in the potential path of movement of the timber to positively limit forward advance of the timber during transportation.

Other objects of the invention will be apparent from the following description of the present preferred form of the invention wherein;

Figure 2 is a detail fragmentary sectional view taken through the boom of the drag and showing the details of construction of the fair lead assembly;

Figure 4 is a detail sectional view taken on the line 4—4 of Figure 2, looking in the direction of the arrows, showing to advantage the manner of mounting the take-off sheave of the fair-lead assembly;

Figure 5 is a detail fragmentary sectional view on the line 5—5 of Figure 2, looking in the direction of the arrows, showing the manner of mounting the housing of the take-off sheave of the fair-lead assembly;

Figure 6 is a detail fragmentary sectional view taken on the line 6—6 of Figure 2, looking in the direction of the arrows, showing the manner of mounting the fair-lead assembly on the boom; and Figure 7 is a rear elevational view of the drag.

Figures 1, 3:
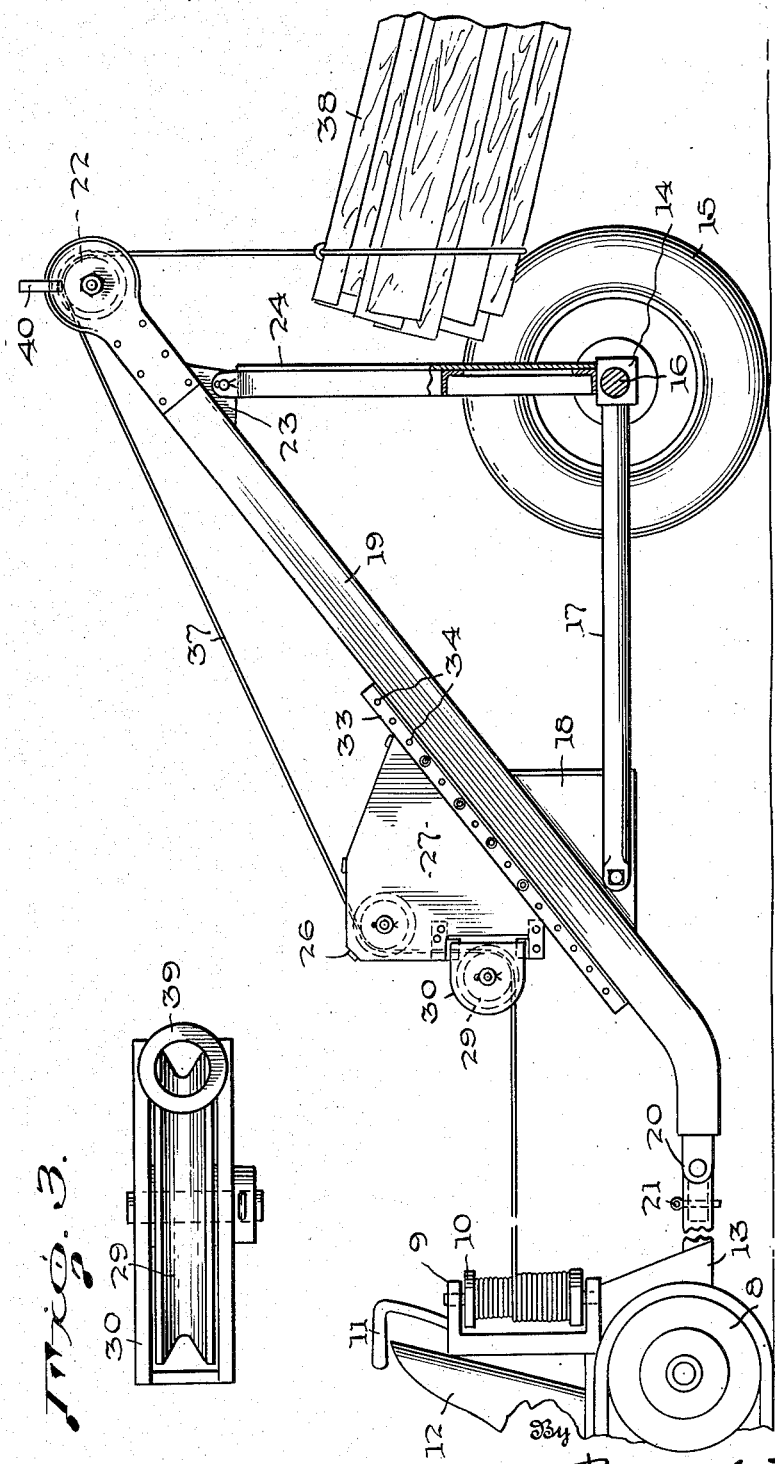
Figure 1 is a side elevational view of a timber drag constructed in accordance with the present invention illustrating its application to a winch-equipped tractor and a bundle of timbers, a part of the bumper plate being broken away to disclose details.
Figure 3 is a top plan view of the lower sheave and movable housing forming a part of the fair-lead assembly.

In order to illustrate the application of this invention, we have in Figure 1 fragmentarily shown a tractor 8 of conventional design which is equipped with a cable take-up winch unit generally designated 9, the winch including a roller 10 and a control lever 11 arranged in operative proximity to the seat 12 of the tractor. The tractor also includes a connecting draw 13 the free terminal of which is bifurcated.

The drag per se consists of a movable support generally designated 14, the support comprising wheels 15 and axle 16. Horizontal supporting bars 17 extend from the axle, adjacent the wheels 15, as illustrated in Figure 7, and converge at their forward ends into engagement with a plate 18 which extends from the lower face of a boom 19. The forward end of the boom is equipped with a universal tractor hitch 20 one of the movable parts of which extends between the branches of the bifurcation of the draw 13 and is engaged to the latter by a single bolt or pin 21. The boom 19, as illustrated advantageously in Figure 1, extends upwardly at an angle and is equipped at its apex with a sheave 22. Lugs 23 extend downwardly from the boom in proximity to the sheave 22, the lugs being engageable, as advantageously illustrated in Figs. 1 and 7, to the opposite sides of a bumper plate 24. The connection between the bumper plate and the lugs 23 of the boom consists of a removable bolt 25 permitting expeditious engagement and disengagement of the boom and bumper plate. The lower end of the bumper plate is engaged in any conventional manner with the horizontal supporting bars 17 and is of a width slightly less than the distance between the wheels 15, as shown in Figure 7, which width is maintained to a point appreciably above the wheels. The drag also includes a fair-lead assembly generally designated 26, which, in the present instance, consists of parallel plates 27 having mounted therebetween an upper intake sheave 28 and a lower take off sheave 29. The sheave 28, as shown particularly in Figures 1 and 2, is fixedly secured between the plates 27. The lower sheave 29 however, is mounted in a sub-assembly or housing 30 which is pivotally mounted, as indicated at 31 and 32, between the plates 27. The housing 30 with its sheave is free to move laterally on the vertical axis provided by the mounting illustrated. The plates 27 are mounted on the boom 19 between flanges 33, the flanges being provided with parallel openings 34 which complement openings formed in the bottom of the plates 27 to receive therethrough connecting bolts 35. In order to maintain the plates 27 in predetermined spaced relation, spools 36 are sleeved over the bolts 35 as shown in Figure 6.

The cable used for elevating one end of the timbers preparatory to transporting the same is indicated at 37. The forward end of the cable is engaged with the winch 10 of the tractor. The aft end of the cable is adapted to encompass one end of a bundle of timbers 38. The intermediate part of the cable is trained over the sheave 22 in the top of the boom and over the sheaves 28 and 29 in the fair-lead assembly. It will be noted, especially upon preference to Figures 2 and 3, that the cable, after having passed from the upper sheave 28 of the fair-lead assembly, extends downwardly through a guide ferrule 39 preparatory to engaging the sheave 29.

By providing the perforate flanges 33 on the boom 19 with the corresponding openings in the bottom of the fair-lead plates 27 through which the bolts 35 extend, the fair-lead assembly is adjustable as a unit. This adjustment permits the take-off sheave 29 of the fair-lead assembly to be uniplanar at all times with the winch 10. It is, of course, to be understood that although the winch 10 is presently shown to be mounted on a vertical axis, it is also customary to mount the winch on a horizontal axis and to vary the plane of positioning the winch on the tractor. With the device of the present invention the cable extending from the tractor to the fair-lead will be maintained in a horizontal plane thereby preventing undue strain on the cable and on the mechanism. This likewise reduces to a minimum the possibility of casual displacement of the timber bundle during transportation. By making the bumper plate of a width substantially coextensive with the space between the traction wheels 15 of the support, the timbers will not be permitted to move axially of the drag beyond the locus of the bumper plate. Correspondingly axial movement of the timber bundle during transportation will be reduced to a minimum.

In order to prevent jumping of the cable 37 from the sheave 22, a guard 40 is provided, the ends of which are secured to the boom 19 at the opposite sides of the sheave 22.

Although we have herein shown and described the preferred embodiment of the invention, it is nevertheless to be understood that changes may be made therein especially in the details of construction, proportion and arrangement of parts within the scope of the claims hereto appended.

What we claim is:

1. A timber drag including in combination a winch equipped tractor, the winch being operated by the tractor motor; a drag connected to the tractor and comprising a boom with sheaves one of which is a cable take off sheave, traction means, a bumper plate interposed between the boom and the traction means, and a cable one end of which is engageable with a bundle of timbers aft of the bumper plate and the opposite end engaged with the tractor winch, the intermediate portion of the cable being trained over said sheaves, some of the sheaves of said boom being adjustable to permit positioning of the cable take off sheave in the horizontal plane with the tractor winch.

2. A timber drag comprising a movable timber support equipped with a boom, one end of the boom projecting above and extending beyond the support, a sheave mounted in said end of the boom, a fair lead assembly mounted on the boom, and a cable trained over said sheave and through the assembly, one end of the cable being adapted for engagement with cable take up means fore of said support, the opposite end of the cable being adapted for engagement with a bundle of timbers aft of the support, said fair lead assembly being adjustable on the boom to position the cable take off end of the assembly uniplanar with said cable take up means.

3. A timber drag for use behind a winch-equipped tractor comprising a boom, the lower end of the boom being adapted for coupling to the tractor, a sheave mounted in the upper end of the boom, a fair lead assembly, including sheaves, mounted on the boom, and a cable trained from the winch over the sheaves, the fair lead assembly being adjustable along the boom to maintain the optimum disposition of the portion of the cable between the winch and the fair lead assembly.

4. A timber drag comprising a boom equipped with sheaves, one end of the boom being adapted for engagement with a tractor, an axle, wheels rotatably mounted on the axle, horizontal supporting bars, the aft ends of which are secured to the axle, the other ends of said bars being connected to the boom, a bumper plate pendantly carried by the opposite end of the boom, the lower end of the plate being engaged with said bars, and a cable trained over said sheaves, one end of the cable being adapted for engagement with a take-up fore of the drag, the opposite end being adapted for engagement with timber aft of the drag.

5. A timber drag comprising a boom, one end of which is adapted for engagement with motive means, an axle, wheels rotatably mounted on the axle, a bumper plate pendantly carried by the free end of said boom, the lower end of the plate being in operative engagement with the axle, a fair lead assembly adjustably secured to the boom, and a cable one end of which is adapted for engagement with timber aft of the bumper plate, the cable being trained through the fair lead assembly, the opposite end of the cable being engageable with said motive means.

6. A timber drag for use behind a winch equipped tractor, said drag comprising a boom extending upwardly at an angle, a sheave carried by the boom, an axle, wheels rotatably mounted on the axle, horizontal supporting bars, one end of each bar being connected to the lower end of the boom, a bumper plate pendantly carried by the upper end of the boom, the lower end of said plate being secured to the horizontal supporting bars, a fair lead assembly, including sheaves, adjustably mounted on the boom, and a cable extending from the winch on the tractor to timber aft of the bumper plate, the intermediate part of the cable being trained over the sheaves in the fair lead assembly and over the sheave on the boom.

ALBERT K. HOVEY-KING.
JAMES H. LOCKHART.

REFERENCES CITED

The following references are of record in the file of this patent:

UNITED STATES PATENTS

| Number | Name | Date |
|---|---|---|
| 1,077,467 | Gardner | Nov. 4, 1913 |
| 1,725,952 | Beebe | Aug. 27, 1929 |
| 1,871,603 | Ginter | Aug. 16, 1932 |
| 1,909,689 | Kuchar | May 16, 1933 |
| 1,918,409 | Langdon | July 18, 1933 |
| 2,058,473 | Le Tourneau | Oct. 27, 1936 |
| 2,078,393 | Le Tourneau | Apr. 27, 1937 |
| 2,394,217 | Tom | Feb. 5, 1946 |